July 22, 1947. R. H. BEYER 2,424,430
FISHING ROD
Filed June 27, 1945 2 Sheets-Sheet 1
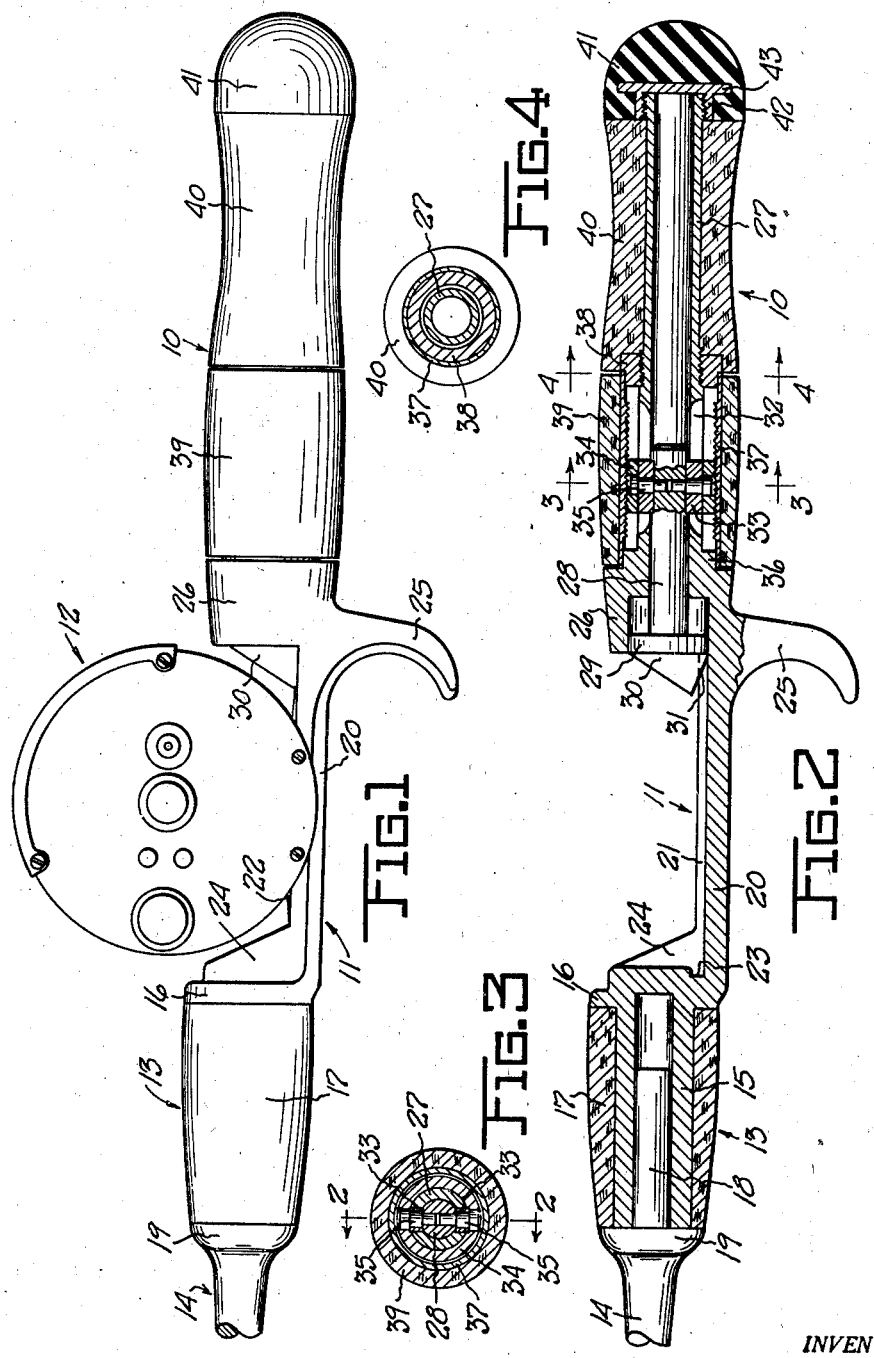
INVENTOR.
RAYMOND H. BEYER.
BY
Oltsch + Knoblock
ATTORNEYS.

July 22, 1947.    R. H. BEYER    2,424,430
FISHING ROD
Filed June 27, 1945    2 Sheets-Sheet 2
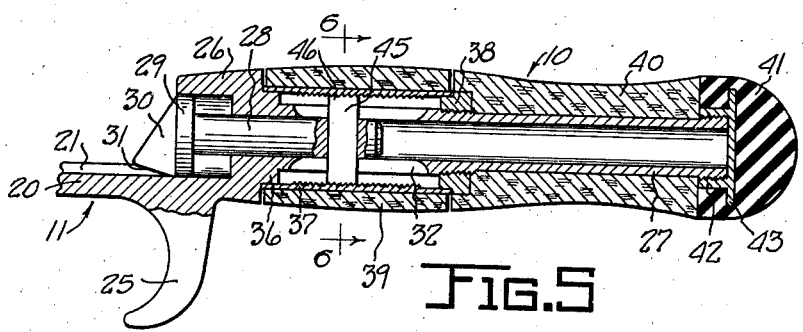
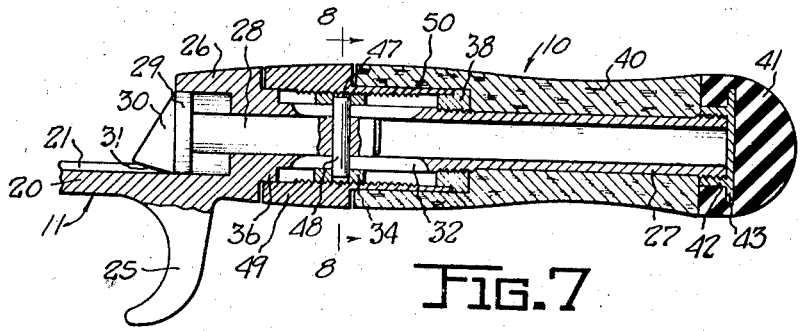
INVENTOR.
RAYMOND H. BEYER.
BY
Oltsch + Knoblock
ATTORNEYS.

Patented July 22, 1947

2,424,430

UNITED STATES PATENT OFFICE 2,424,430

FISHING ROD

Raymond H. Beyer, South Bend, Ind., assignor to South Bend Bait Company, South Bend, Ind., a corporation of Indiana Application June 27, 1945, Serial No. 601,770

6 Claims. (Cl. 43—22)

This invention relates to improvements in fishing rods, and particularly to the reel seat of a fishing rod by means of which a fishing reel is anchored or secured to a fishing rod, and the means for controlling the locking element of the reel seat.

The primary object of the invention is to provide a fishing rod having an off-set reel seat and novel means for locking a fishing reel at said reel seat.

A further object is to provide a fishing rod having a reel seat including a locking device and a handle, wherein said handle has a rotatable section adapted to actuate the reel seat locking device.

A further object is to provide a fishing rod having a handle and a reel seat with means incorporated within the handle for actuating reel clamping means associated with the reel seat.

A further object is to provide a fishing rod having a handle formed of a plurality of sections and housing therein mechanism for controlling the locking device of a reel seat.

A further object is to provide a fishing rod having a sectional handle including a resilient butt and means for detachably securing said butt to said handle.

Other objects will be apparent from the description, drawings and appended claims.

In the drawings:

Fig. 1 is a fragmentary side view of a fishing rod illustrating one embodiment of my invention.

Fig. 2 is a longitudinal sectional view taken on line 2—2 of Fig. 3.

Fig. 3 is a transverse sectional view taken on line 3—3 of Fig. 2.

Fig. 4 is a transverse sectional view taken on line 4—4 of Fig. 2.

Fig. 5 is a longitudinal sectional view similar to Fig. 2 of a modified embodiment of the invention.

Fig. 6 is a transverse sectional view taken on line 6—6 of Fig. 5.

Fig. 7 is a longitudinal sectional view similar to Fig. 2 of another modification of the invention.

Fig. 8 is a transverse sectional view taken on line 8—8 of Fig. 7.

Referring to the drawings, and particular to Figs. 1 to 4, which illustrate one embodiment of the invention, the numeral 10 designates the handle portion of a fishing rod which is provided with a reel seat 11 adapted to mount a fishing reel 12, a forward grip portion 13 and a flexible rod portion 14.

A unitary casting forms the frame of the handle, reel seat and forward grip portions. This casting may be formed of steel, aluminum or other suitable metal. The front portion 15 of the casting is tubular and has an enlarged shoulder 16 at its rear end. A tubular grip portion 17 formed of cork or other suitable material fits snugly around the frame portion 15 with its rear end portion abutting the shoulder 16. The rod 14, which may be formed of steel, bamboo or other suitable material, is provided with a coaxial projecting portion 18 which fits snugly within the tubular casting portion 15, and with an enlargement or shoulder portion 19 which bears against the outer end of the casting. It will be understood, however, that any desired form of interconnecting or securing means may be employed to secure the rod and handle units together.

The intermediate portion 11 of the casting which forms the reel seat comprises a substantially flat or plate-like portion 20 which is off-set laterally from and extends longitudinally of the rest of the casting. Portion 20 preferably has longitudinal upwardly directed ribs 21 formed at its sides and spaced to receive therebetween the base plate 22 of the fishing reel 12. The rear face of the shoulder 16 has a notch 23 opening at the upper surface of plate portion 20 to receive the forward end of the reel plate 22. Reinforcing ribs 24 are provided between the ribs 21 and the shoulder portion 16. A finger-engaging hook 25 projects from the plate portion 20 adjacent its rear end.

A tubular socket 26 is formed in the frame casting at the rear end of the reel seat portion 11 thereof. Socket 26 is axially aligned with tubular portion 15 of the frame, and is open at its front end, i. e., facing the reel seat. An elongated, tubular, reduced diameter extension 27 projects rearwardly from the socket 26. A rigid rod 28 fits snugly and slidably within the tubular frame portion 27 and mounts a head 29 on its outer end which is slidable in socket 26. The head has a nose portion 30 formed at its outer end, and the lower surface 31 of this nose portion is upwardly and outwardly inclined to overlie and clamp the rear end of the reel base plate 22 upon the reel seat plate 20.

The tubular frame extension 27 has a pair of opposed longitudinal slots 32 formed therein adjacent socket 26. A pair of guide members 33 fit slidably in the slots 32. A ring 34 slidably encircles the frame extension 27 at the guides, and pins 35 serve to secure the ring 34 and guides 33 to the rod 28 as a unit. Ring 34 is externally screwthreaded. A circular shoulder 36 is formed at the rear of socket 26, of a diameter substantially equal to the external diameter of ring 34. An elongated internally screw threaded sleeve 37 is journaled at its forward end on shoulder 36. Ring 34 is in screw threaded engagement with sleeve 37. A ring 38 is screw threaded on the tubular frame extension 27 rearwardly of slots 32 and has a reduced diameter portion on which the rear end portion of sleeve 37 is journaled. A tubular hand grip portion 39, formed of cork or like material, is secured to and embraces sleeve 37, the outer surface thereof preferably being of a size and contour to merge with the outer surface of socket 26 in stream-line form.

A second cork hand grip tubular portion 40 fits snugly upon the frame extension 27 rearwardly of grip portion 39, and preferably terminates short of the end of extension 27. A butt 41 of substantially semi-circular shape is formed of rubber or other material and is preferably resilient. Butt 41 has an internally screw threaded thimble 42 imbedded therein and screw threaded upon the end of extension 27 projecting outwardly from handle 40. Thimble 42 may have a laterally enlarged flange 43 anchored within the butt.

The construction is easily assembled, with the butt 41 serving to hold the parts in assembled relation. Thus the parts 28, 33 and 34 can be properly arranged with respect to extension 27 and slots 32 thereof and secured by pins 35. Sleeve 37 and hand grip part 39 can then be applied as a unit by threading them on ring 34. Ring 38 is then threaded on extension 27, for which purpose the outer end of said extension is preferably of slightly smaller diameter than the portion at which said ring is threaded, as illustrated. Grip part 40 is then applied, followed by threaded connection of butt 41 on the end of extension 27.

It will be observed that the handle is thus formed in sections, of which part 39 may be rotated. As the grip part 39 and sleeve 37 are rotated, the ring 34 is shifted longitudinally by virtue of the action of guides 33 which restrain ring 34 from rotation with the sleeve 37. The longitudinal adjustment of the ring is transmitted by pins 35 to rod 28 and locking head 29 which also are held against rotation by guides 33. Consequently, the means for actuating the reel lock is confined within the handle, is easy to operate and permits full streamlining of the rod and handle.

The detachable mounting of the butt facilitates rapid and easy disassembly of the parts, if necessary for repair purposes. Also, the formation of the butt from resilient material is a distinct advantage in fishing rods to prevent the marring of surfaces engaged thereby and to take up the shock of impact and thereby avoid possibility of damage to the device.

In normal use of the fishing rod, both handle portions are gripped. Consequently, the rotatable grip part is held stationary by the user so that the reel locking means cannot be released. Also, when the device is not in use, the locking means is held against release because of the resistance of the screw threads, which may be of any standard lead, to movement of the locking member and also because of the relatively large angular movement of the rotatable grip 39 necessary to produce movement of the locking head 29 sufficient to release a reel from the reel seat.

A slightly modified embodiment of the invention is shown in Figs. 5 and 6 wherein the same reference numerals are used as in Figs. 1 to 4. In this embodiment a cross-piece 45, preferably of rectangular cross-section, extends through rod 28 and projects therefrom through slots 32 into engagement with sleeve 37. The outer end faces of the cross-piece 45 have screw teeth 46 cut therein for screw threaded engagement with the screw teeth of sleeve 37. This embodiment operates in the same manner as that of Figs. 1 to 4, the cross-piece combining the functions of guides 33, ring 34 and pins 35 of the Fig. 1 embodiment.

The modification of the device shown in Figs. 7 and 8 entails the provision in ring 34 of diametrically opposed openings 47 to receive a pin 48 which spans the ring and passes through passages 32 of extension 27 and a transverse passage in rod 28. Also, the sleeve 37 is provided with an integral thickened portion 49 at its forward end whose surface merges with the surface of socket 26 to form the part of the hand grip which is rotated to control or actuate the reel seat lock. The stationary grip portion 40 is provided with a portion 50 having an enlarged bore freely encircling the small diameter part of sleeve 37 rearwardly of part 49.

In each of the modified embodiments the same advantages are obtained as in the preferred embodiment, the only material difference therefrom being matters of comparative costs and convenience of manufacture.

Other variations of the device are also possible within the scope of the invention and within the spirit of the claims.

I claim:

1. In a fishing rod, a unitary member adapted to be secured to the end of a rod and including a reel seat portion and a longitudinally slotted tubular portion, a locking member slidable in said tubular portion and adapted to cooperate with said reel seat to detachably mount a reel, a pair of interfitting threaded parts encircling said tubular portion, means extending through the slot of said tubular portion for connecting the inner threaded part with said locking member, the outer threaded part forming a partial hand grip, and a second, stationary hand grip part mounted on said tubular member.

2. In a fishing rod, a unitary member adapted to be secured to the end of a rod and including a reel seat portion and a socketed handle portion, a reel seat locking member having a part mounted in said handle portion, a rotatable hand grip part and a stationary hand grip part each mounted on said handle portion, and a member connected to said locking member and shiftable longitudinally and non-rotatively in said handle part, said last named member having screw threaded connection with said rotatable grip part.

3. In a fishing rod, a unitary member adapted to be secured to the end of a rod and including a reel seat portion and a socketed handle portion, a reel seat locking member having a part mounted in said handle portion, a rotatable hand grip part and a stationary hand grip part each mounted on said handle portion, and advancing means connected to said locking member fitting within and having screw threaded connection with said rotatable hand grip to advance said locking member, said advancing means being shiftable longitudinally of said handle part and restrained thereby against rotation.

4. In a fishing rod, a unitary member adapted to be secured to the end of a rod and including a reel seat portion and a socketed handle portion, a reel seat locking member having a part mounted in said handle portion, a rotatable hand grip part and a stationary hand grip part each mounted on said handle portion, and advancing means carried by said locking member and having screw threaded connection with said rotatable hand grip, said handle portion having a longitudinal slot and said advancing means including a part slidable in said slot.

5. In a fishing rod, a unitary member adapted to be secured to the end of a rod and including a reel seat portion and a socketed handle portion, a reel seat locking member having a part mounted in said handle portion, a rotatable hand grip part and a stationary hand grip part each mounted on said handle portion, said handle portion having a longitudinal slot, a guide slidable in said slot, a member having screw threaded engagement with said rotatable handle portion, and means securing said last named member and said guide to said locking member.

6. In a fishing rod, a unitary member adapted to be secured to the end of a rod and including a reel seat portion and a socketed handle portion, a reel seat locking member having a part mounted in said handle portion, a rotatable hand grip part and a stationary hand grip part each mounted on said handle portion, said handle portion having a longitudinal slot, a guide carried by said locking member and slidable in said slot, and a ring carried by said guide and slidably encircling said handle portion, said ring having screw threaded engagement with said rotatable handle portion.

RAYMOND H. BEYER.

REFERENCES CITED

The following references are of record in the file of this patent:

UNITED STATES PATENTS

| Number | Name | Date |
| --- | --- | --- |
| 2,057,535 | McKechnie | Oct. 13, 1936 |
| 820,685 | Terry | May 15, 1906 |
| 1,271,073 | Patten | Juy 2, 1918 |
| 2,162,157 | Clark | June 13, 1939 |
| 1,711,248 | Powell | Apr. 30, 1929 |
| 2,144,122 | Pflueger | Jan. 17, 1939 |

FOREIGN PATENTS

| Number | Country | Date |
| --- | --- | --- |
| 205,318 | Great Britain | Oct. 18, 1923 |